(12) United States Patent
Oki et al.

(10) Patent No.: US 6,616,439 B2
(45) Date of Patent: Sep. 9, 2003

(54) ROUNDING APPARATUS

(75) Inventors: Yuzuru Oki, Kanagawa (JP); Hiroshi Noda, Kanagawa (JP)

(73) Assignee: Oshikiri Machinery Ltd., Tokyo (JP)

( * ) Notice: Subject to any disclaimer, the term of this patent is extended or adjusted under 35 U.S.C. 154(b) by 0 days.

(21) Appl. No.: 09/967,416

(22) Filed: Sep. 28, 2001

(65) Prior Publication Data

US 2002/0037336 A1 Mar. 28, 2002

(30) Foreign Application Priority Data

Sep. 28, 2000 (JP) .......................... 2000-297722

(51) Int. Cl.⁷ .............................. A21C 3/02; A21C 11/00
(52) U.S. Cl. ......................................... 425/183; 425/332
(58) Field of Search .................. 425/183, 332, 425/364 R (56) References Cited

U.S. PATENT DOCUMENTS

| 3,521,578 | A | * | 7/1970 | Fraioli, Sr. .................. 425/332 |
| 5,714,178 | A | * | 2/1998 | Keener ........................ 425/332 |
| 5,750,169 | A | * | 5/1998 | Rose et al. .................. 425/333 |
| 6,123,537 | A | * | 9/2000 | Cummins et al. ........... 425/332 |

* cited by examiner

*Primary Examiner*—James P. Mackey
(74) *Attorney, Agent, or Firm*—Brinks Hofer Gilson & Lione (57) ABSTRACT

A rounding apparatus for rounding dough pieces comprises a conveyer having a surface for supporting thereon and transporting dough pieces; and a plurality of rounder bars any one of which is selectively brought into contact with the surface of the conveyor to engage with the dough pieces conveyed by the conveyor thereby rotating the dough pieces on the surface of the conveyor to round the dough pieces.

16 Claims, 9 Drawing Sheets

ROUNDING APPARATUS

BACKGROUND OF THE INVENTION

The present invention relates to a rounding apparatus for rounding dough. More specifically, it relates to an apparatus for taking dough that has been divided into dough pieces of a set size, and continuously rounding the dough pieces to form them into a given shape.

Baked goods such as breads and pastries are made by dividing a set amount of dough into individual pieces and forming these divided dough pieces into a given shape. The shaped dough balls are then baked to produce the end product. At present, the forming of dough into dough pieces of a given shape is performed using rounding apparatus.

The rounding methods used by the dough-rounding apparatus in use today include one method in which a cylindrical cup placed over and covering the dough piece is rotated eccentrically to round the dough, and another method in which dough pieces become progressively more rounded as they are moved in contact with rounder bars (cylindrical dies with dough-shaping surfaces). In the latter of these two methods, the rounder bars are placed above a conveyer carrying dough pieces, and the dough pieces are rounded by the rounder bars as they are continuously moved along by the conveyer. This method provides especially good production efficiency.

Each of the rounder bars in such a system has its own particular dough-shaping surface for rounding the dough, and it performs a specific rounding action associated with this dough-shaping surface. The rounding apparatus setup procedure for switching production over from a product A lot to a product B lot requires removing the rounder bars for shaping product A and replacing them with rounder bars for shaping product B.

Since the dough is gradually rounded by a rounder bar as it is moved along the conveyer, the contact surface of the rounder bar is formed long in the direction of travel, necessarily making the rounder bars long and bulky.

This creates a problem in that it makes labor intensive the process of replacing each rounder bar with a different bar above the conveyer, causing excessive equipment setup time. Also the trend in recent years has been toward producing more kinds of bread in a greater number of low quantity production runs. This has increased the frequency of rounder bar replacement, resulting in significant losses in terms of rounding equipment setup time.

The present invention was devised to solve the above problem. The present invention provides a rounding apparatus in which the changing of rounder bars is very simple and the equipment setup time short, i.e., a rounding apparatus that can quickly be adapted to accommodate different lots.

BRIEF SUMMARY OF THE INVENTION

In light of the above problem, the present inventors conducted extensive research in which a configuration was found wherein, by rotating rounder bars, one rounder bar can easily be replaced with another switchable alternate rounder bar. The present invention was perfected based on the configuration found in this study.

The present invention provides, in a first aspect thereof, a rounding apparatus for rounding divided dough pieces into a given shape. The apparatus comprises a conveyer for transporting the dough pieces and a rounder bar placed in contact with the conveyer for rounding the dough pieces. The rounder bar can be replaced by a different rounder bar by switching.

Provided in a second aspect is a rounding apparatus for rounding divided dough pieces into a given shape. Such an apparatus comprises a conveyer for transporting the dough pieces and a plurality of rounder bars configured for rounding the dough pieces. The rounder bars can be selectively switched by rotating one of them into position in contact with the conveyer.

Provided in a third aspect of the present invention is the rounding apparatus of the above second aspect, wherein the rounder bars comprise a first stage rounder bar in front and a second stage rounder bar therebehind.

Provided in a fourth aspect of the present invention is the rounding apparatus of the above third aspect, wherein dough-shaping surfaces of respective rounder bars are placed on opposite sides thereof.

Provided in a fifth aspect of the present invention is the rounding apparatus of the above second aspect, wherein a bottom edge piece of each rounder bar is a replaceable unit separate from the main rounder bar unit.

Provided in a sixth aspect of the present invention is the rounding apparatus of the above second aspect that comprises two rounder bars placed at angular positions separated from each other by 90 degrees.

Provided in a seventh aspect of the present invention is the rounding apparatus of the above second aspect, wherein the rounder bars are installed on a rotating frame supported by a main frame of the rounding apparatus.

Provided in an eighth aspect of the present invention is the rounding apparatus of the above seventh aspect, wherein an upright bracket is attached to the rotating frame, and a securing bolt is inserted through a slot in the bracket into the mainframe for securing the bracket to the main frame.

Provided in a ninth aspect of the present invention is a rounding apparatus for rounding divided dough pieces into a given shape. The apparatus comprises a conveyer for transporting the dough pieces, and a first stage rounder bar in front and a second stage rounder bar therebehind for rounding the dough pieces. Each of the rounder bar stages has a plurality of rounder bars, including a switchable alternate rounder bar, and each rounder bar is installed on a rotating frame that is rotatably installed on a main frame. A bracket is installed upright on the rotating frame, and provided on the main frame is a securing bolt that is inserted through a slot in the bracket for being tightened to secure the bracket to the main frame. One of the rounder bars in each stage can be selectively switched by rotating it such as to place it in contact with the conveyer.

BRIEF DESCRIPTION OF THE DRAWINGS

These and other features, aspects, and advantages of the present invention will become apparent with reference to the following description, claims, and accompanying drawing, where:

FIGS. 5(A) and 5(B) show the rounder bar switching mechanism of a rounding apparatus of the present invention.

DETAILED DESCRIPTION OF THE INVENTION

The best mode for implementing a rounding apparatus according to the present invention is described below, with reference to the drawings. The present mode will be described using an example of a rounding apparatus provided with two stages of rounder bars 1.

Figure 1:
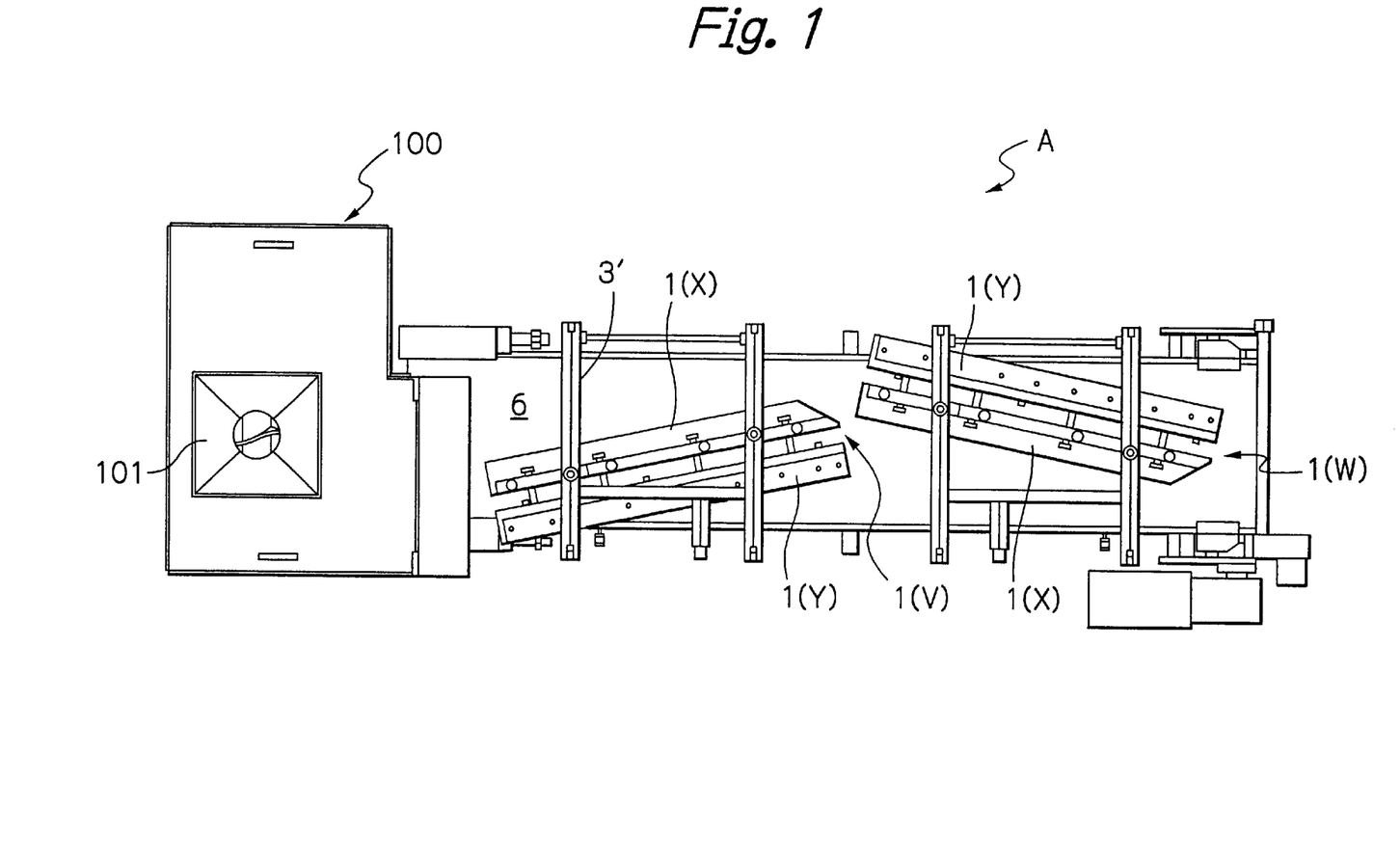
FIG. 1 shows a simplified plan view of an entire rounding apparatus.
Figure 2:
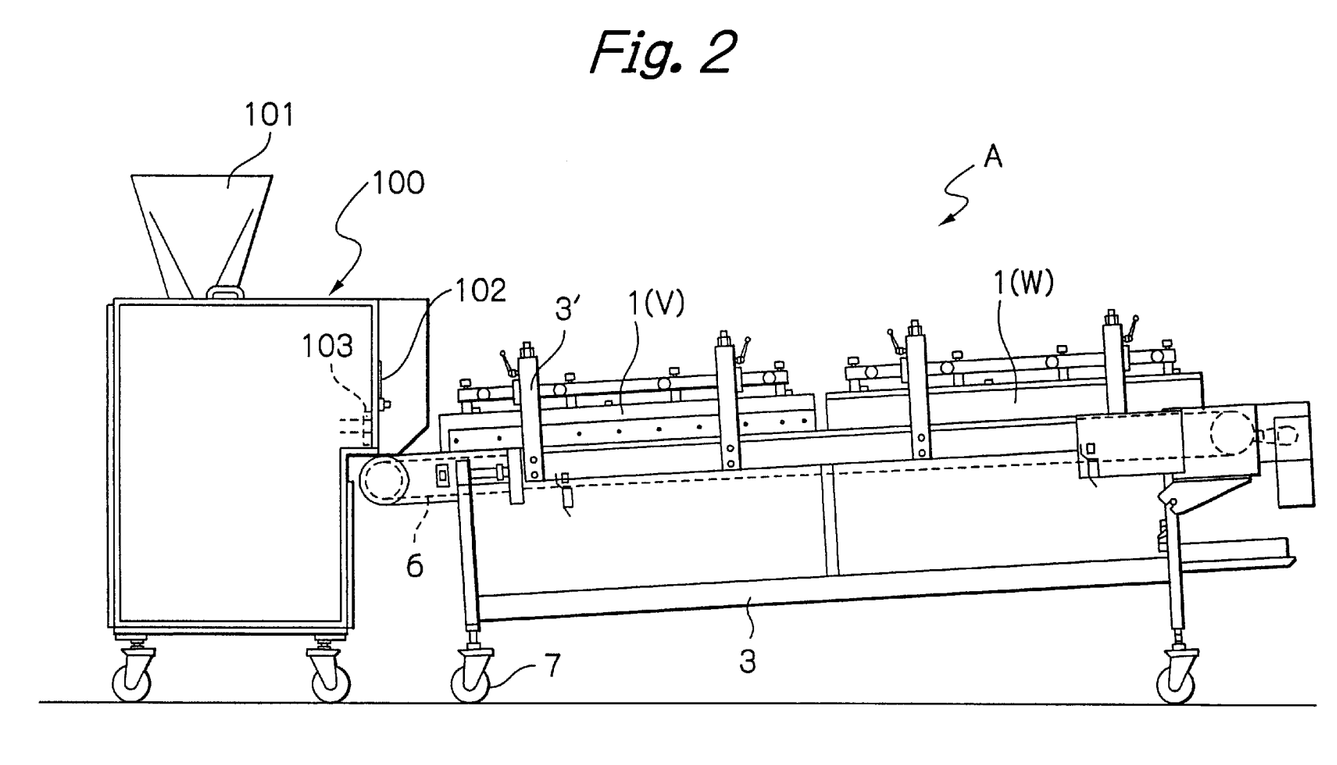
FIG. 2 shows a simplified side view of an entire rounding apparatus.

Shown in FIGS. 1 and 2, respectively, are simplified plan and side views of the entire rounding apparatus. A dividing apparatus 100, at the left side of the drawing, continuously supplies dough pieces containing a set amount of dough to a rounding apparatus A. That is, dough brought into the system from above through a hopper 101 is pressed out horizontally through a collar, using a screw. As the dough is pressed out, it is divided into individual dough pieces, each containing a prescribed amount of dough, by a cutter 102 rotating at a given cycle period. Dough pieces divided in this manner are supplied to a rounding apparatus positioned downstream of the dividing apparatus.

The rounding apparatus A has a conveyer 6 for moving dough thereon, and rounder bars 1 for gradually rounding the dough. The conveyer 6 and rounder bars 1 are installed on a main frame 3 of the rounding apparatus A. Provided at the bottom of the main frame 3 are casters 7 for enabling the entire rounding apparatus A to be moved. The rounder bars 1 are placed in contact with the conveyer 6 in the direction of motion thereof.

As shown in these drawings, a first stage rounder bar 1 (V) is provided at the first half of the conveyer. This first stage rounder bar 1 is followed by a second stage rounder bar 1 (W) placed downstream thereof. The first stage rounder bar 1 (V) is generally aligned with the direction of travel of the conveyer 6, but inclined at an angle thereto (slanting from the right side of the conveyer toward its center, as shown in FIG. 1). The second stage rounder bar 1 (W) is similarly aligned with the direction of travel of the conveyer 6, at an incline from the left side of the conveyer toward its center, as shown in FIG. 1.

As mentioned above, the conveyer 6 and rounder bars 1 are installed on the main frame 3 of the rounding apparatus A. This installation of the rounder bars 1 on the conveyer 6 is such that it enables them to be rotated by a switching mechanism to a standby position at a given height of separation over the conveyer 6, as appropriate.

Figure 5A:
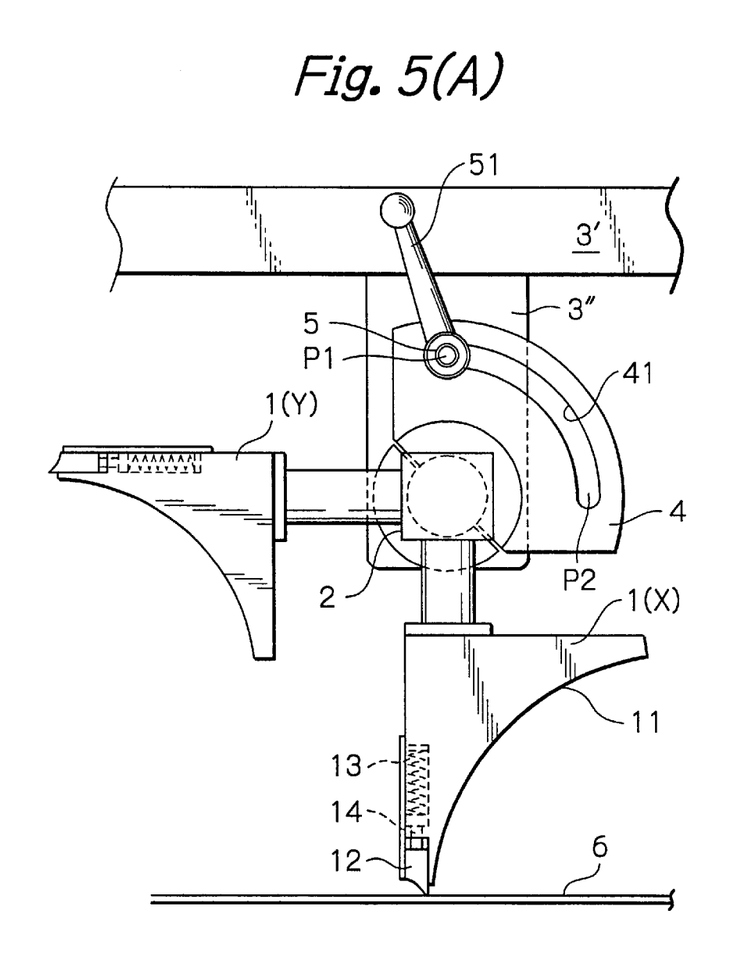
FIG. 5(A) shows the apparatus prior to switching.
Figure 5B:
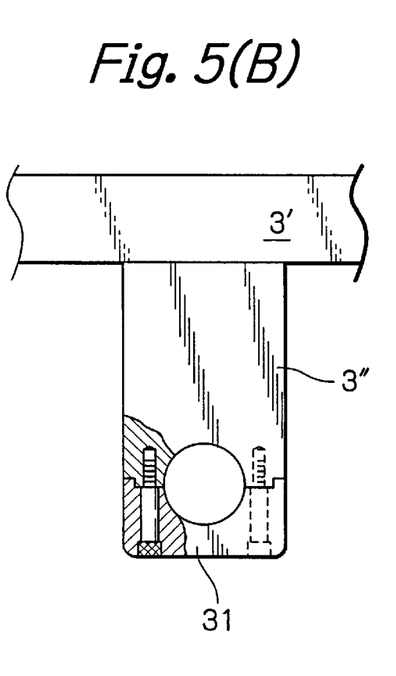
FIG. 5(B) shows a main frame supporting a rotating frame.
Figure 6:
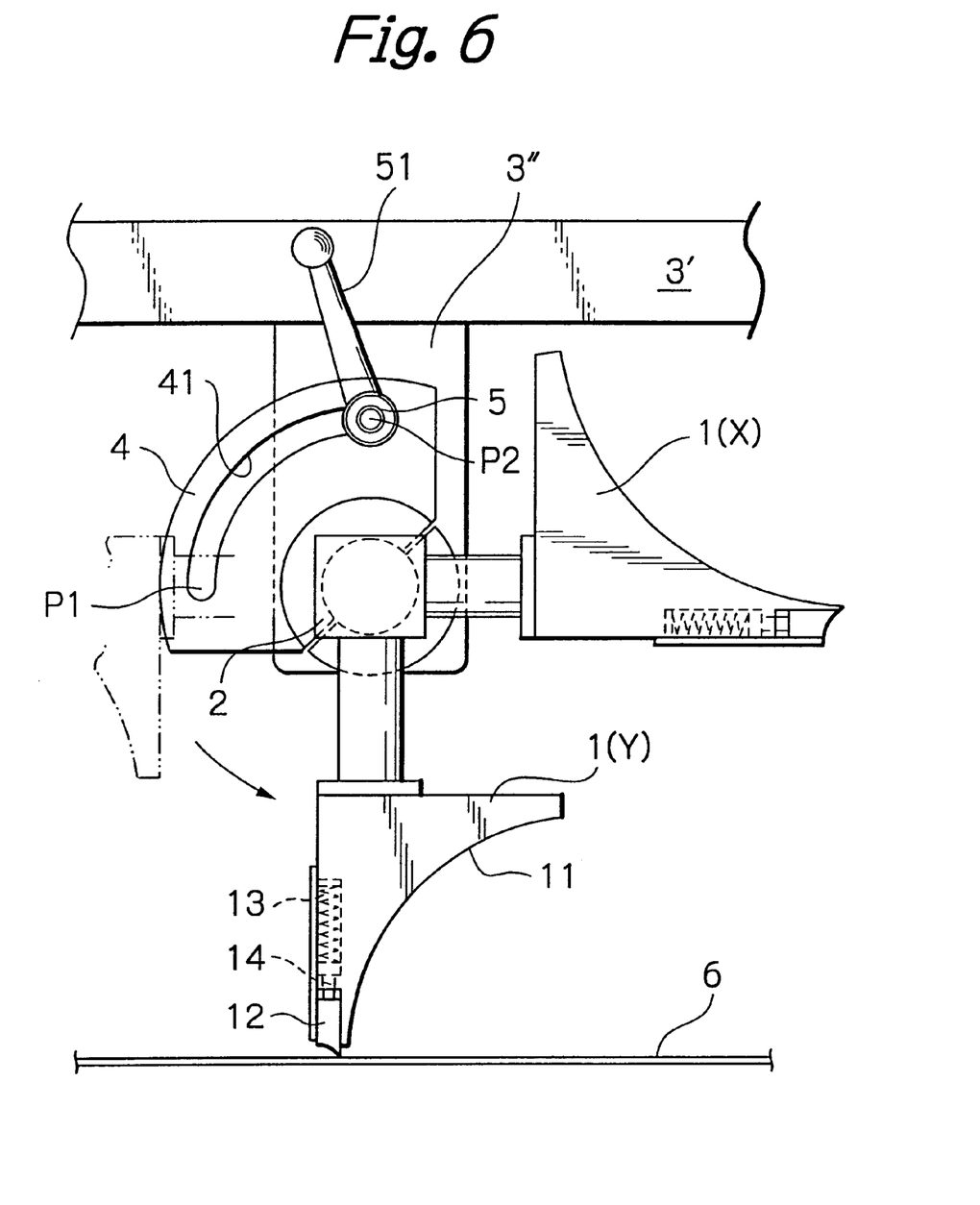
FIG. 6 shows the rounder bar switching mechanism of a rounding apparatus of the present invention, after switching.

FIGS. 5(A) and 5(B) show a switching mechanism for a rounder bar 1 of a rounding apparatus A of the present invention. FIG. 5(A) shows the switching mechanism, and FIG. 5(B) shows the main frame 3 on which the switching mechanism is rotatably supported. FIG. 6 shows the same rounder bars 1 of the rounding apparatus A of the present invention after switching.

As will be understood from the drawings, first, the main frame 3 is provided with gate-shaped support members 3' straddling the conveyer 6 in a position traversing the conveyer. Each of the support members 3' has a hanger provided on a center horizontal cross member thereof. A rotating member 2 is rotatably supported by the hangers. The rotating member 2 can be removed from the hangers by removing split portions 31 of the hangers.

Multiple rounder bars 1 can be installed on a rotating member, but in this case there are two: an 'in-use' rounder bar 1 (X); and a 'switchable alternate' rounder bar 1 (Y). The switchable alternate rounder bar 1 (Y) is positioned so that it can be switched onto the conveyer 6 in place of the currently in-use rounder bar 1 (Y), when required. This will be described in detail later.

A bracket 4 is mounted on the rotating member 2. Formed in this bracket 4 is an elongated arc-shaped slot 41 that extends through an arc of 90 degrees. A securing bolt 5 extends through this slot 41 of the bracket 4 and is threadably engaged with the frame. The bracket 4 can be easily secured to the main frame 3 by tightening a handle 51 on this securing bolt 5.

The switchable alternate rounder bar 1 (Y) and the in-use rounder bar 1 (X) are installed on the rotating member 2 to form a right angle therebetween. Normally, the in-use rounder bar 1 (X) is placed in contact with the conveyer 6 by tightening the securing bolt 5 when it is positioned at one end of the elongated slot 41 (point P1) as shown in FIG. 5(A). If, from this state, the rotating member 2 is rotated as far as possible in the counter-clockwise direction the securing bolt 5 will then be positioned at the other end of the slot 41 of the bracket 4 (point P2).

This rotation lifts the in-use rounder bar 1 (X) above the conveyer 6, and lowers the switchable alternate rounder bar 1 (Y) onto the conveyer 6 in its place. Now, the securing bolt 5 is tightened, securing the bracket 4 to the main frame 3, to thus lock the switchable alternate rounder bar 1 (Y) firmly in position on the conveyer.

The cross-sectional shapes of the dough-shaping surfaces 11 of the rounder bars are arc-shaped curves that differ from one rounder bar to another.

Figure 4A:
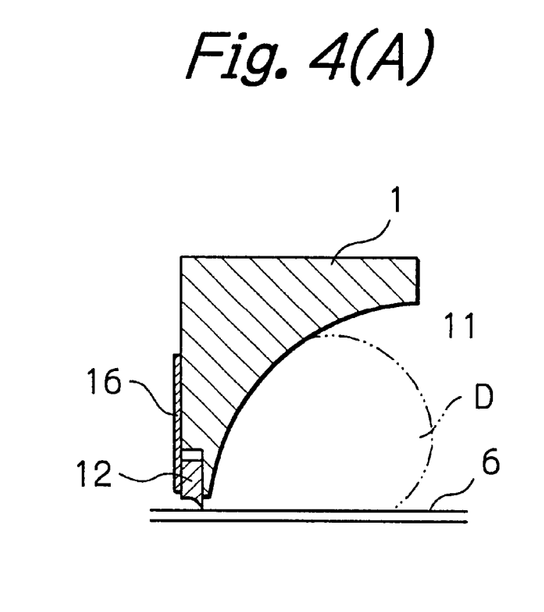
FIGS. 4(A), 4(B) and 4(C) show various cross section views of a rounder bar in a rounding apparatus of the present invention.
Figure 4B:
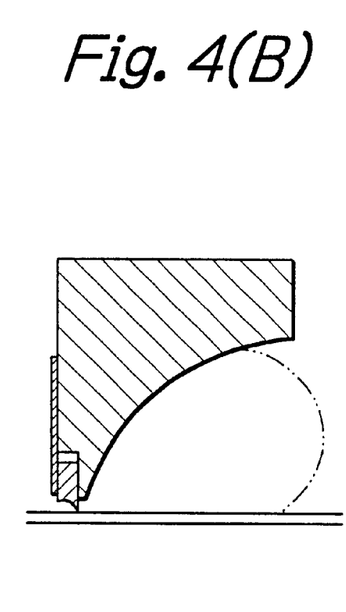
Figure 4C:
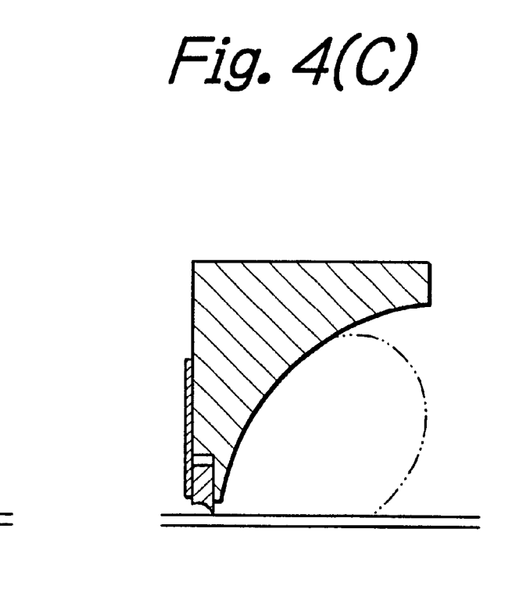

FIGS. 4(A), 4(B) and 4(C) are cross-section views of the rounder bar and show the relationship between the dough-shaping surface 11 of a rounder bar 1 and the dough (shown in dotted lines). The example shown here is of a first stage rounder bar in which the dough is being rotated and rounded as it moves along from A to B to C in contact with the dough-shaping surface.

First, a divided dough piece D is received (FIG. 4(A)); then, the dough is momentarily pressed downward to consolidate it (FIG. 4(B)); and finally, the dough is urged upward to form the desired spherical shape (FIG. 4(C)).

A large number of thin vertical grooves (anti-slip grooves 16) are formed in the dough-shaping surface 11. The reason for this is that dough, while being in contact with the dough-shaping surface 11, tends to slip thereon, thereby failing in performing proper rounding function.

Figure 7:
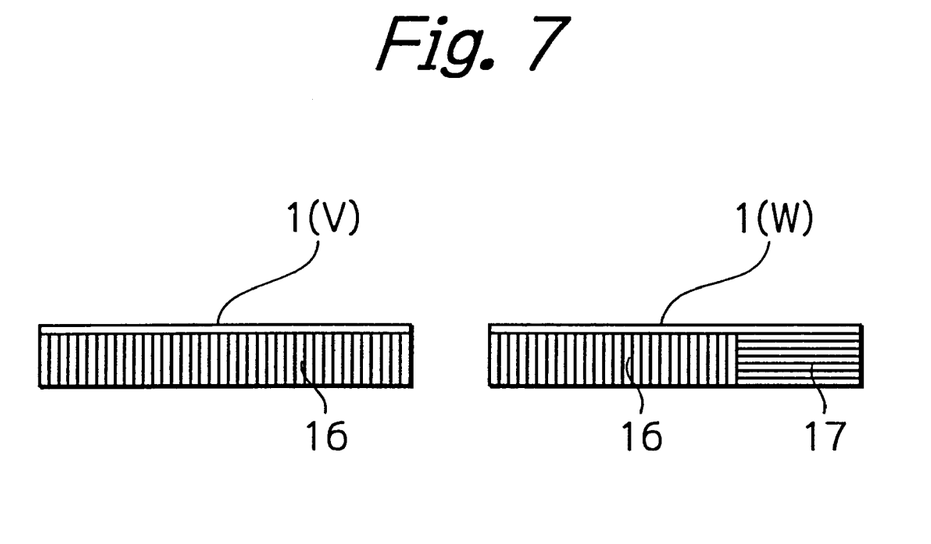
FIG. 7 shows typical grooves formed in the dough-shaping surface of a rounder bar of the present invention.

Typical grooves of this kind are shown in FIG. 7. The first stage rounder bar 1 (V) shown here has vertical grooves formed throughout the entire length of the surface. The first half of the second stage rounder bar 1 (W) also has the same kind of vertical grooves as the first stage rounder bar 1 (V), but its second half has narrow horizontal grooves.

Although proper dough-rounding action is obtained in the first stage rounder bar 1 (V) and the first half of the second stage rounder bar 1 (W), the dough-shaping surface 11 leaves undesirable vertical groove marks in the surface of the dough. These groove marks are repaired/removed by the horizontal grooves in the second half (the groove mark repair section 17) of the second stage rounder bar 1 (W).

Note that the rounder bar has a removable bottom edge piece 12 that is separate from the main rounder bar unit.

Figure 3:
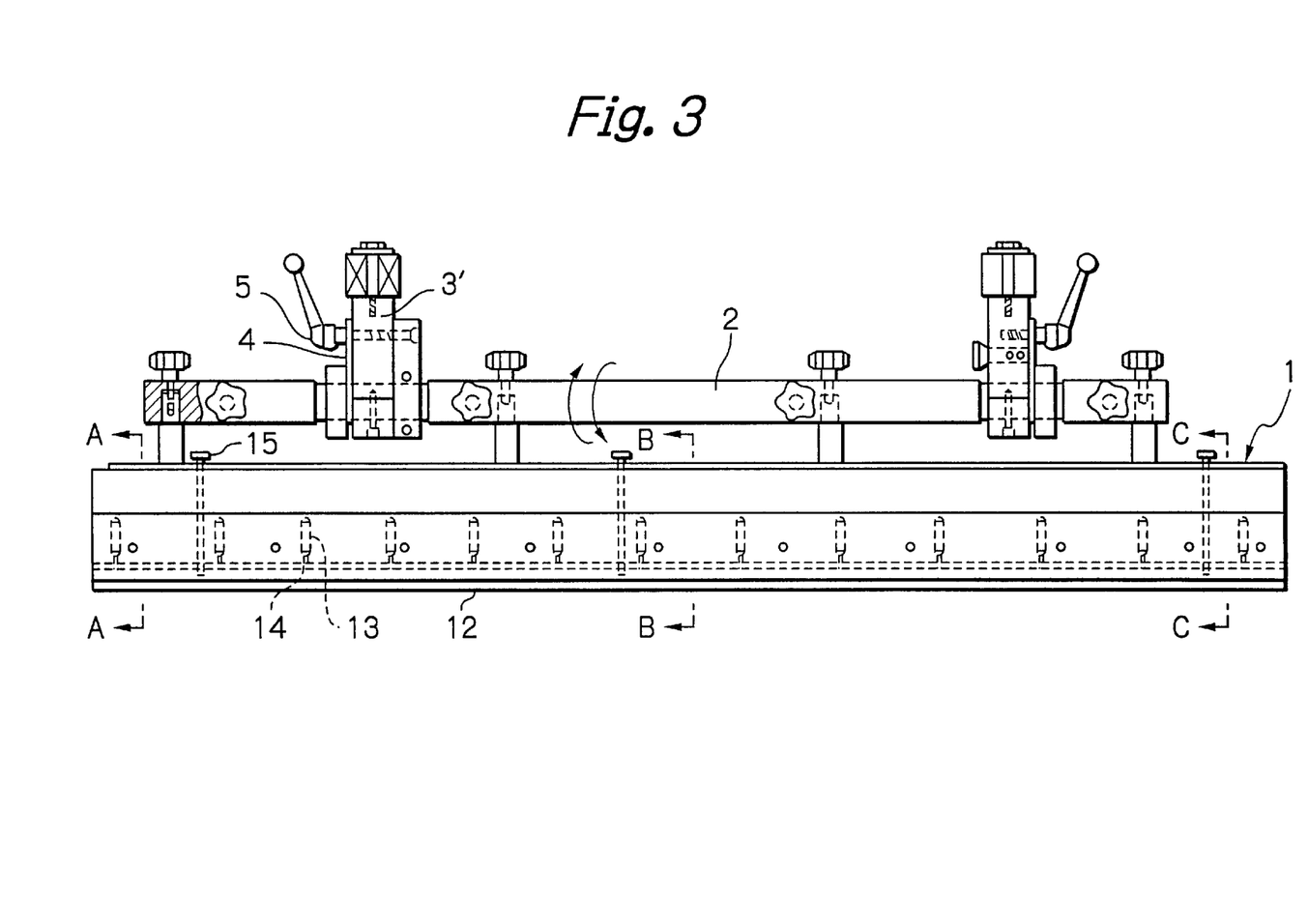
FIG. 3 shows a side view of rounder bars in a rounding apparatus of the present invention.

FIG. 3 shows a side view of a rounder bar, and FIGS. 4(A), 4(B) and 4(C) show cross-sectional views of the same rounder bar at sections A—A, B—B, and C—C of FIG. 3. As can be seen from these drawings, a blade-shaped bottom edge piece 12 is supported in the main unit of the rounder bar by spring pressure in such a manner that the bottom edge piece 12 is urged against the conveyor under pressure applied by springs 13 through pins 14.

The bottom edge piece 12 is attached to the rounder bar main unit by fastening bolts 15 such as to limit the downward travel of the bottom edge piece 12 to a set length. When the rounder bar is set on the conveyor 6, its bottom edge piece 12 receives constant spring pressure urging it against the surface of the conveyor 6. The reason the rounder bar must be kept in firm contact with the conveyor 6 is that if a gap were allowed to exist at this point, dough would get caught in the gap and be damaged.

The disadvantage of this is that constant contact between the rounder bar 1 and the surface of the conveyor 6 results in friction that quickly wears down the tip of the bottom edge piece 12, and when this wear becomes excessive, it requires replacement. In the rounder bar of the present invention, however, when replacement becomes necessary, only the bottom edge piece 12 need be replaced; not the entire rounder bar. This is cost-effective, and the replacement procedure is also quite easy in that it requires only removal of the fastening bolts 15.

Figure 8:
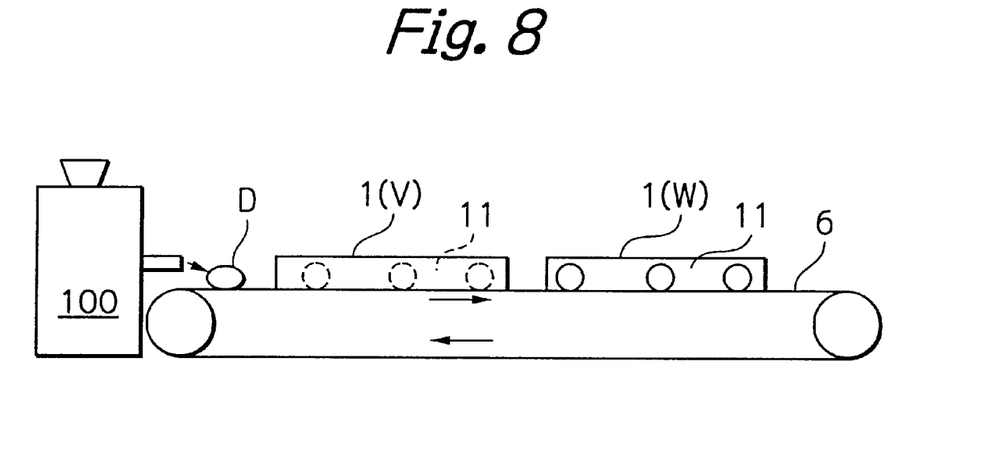
FIG. 8 is a simplified of rounding action as performed in the present invention.

Next, the operation of the rounding apparatus A for rounding a dough piece D will be described. FIG. 8 is a simplified diagram of this operation. First, a dividing apparatus 100 divides dough into dough pieces D containing a set amount of dough. These divided dough pieces D are continuously supplied to a conveyor 6 of a rounding apparatus A. When thus supplied, the dough pieces D are loaded onto the conveyor in a position corresponding to that of a dough-shaping surface 11 of a rounder bar 1 placed on the conveyor. As they move, the dough pieces D loaded on the conveyor come into contact with the dough-shaping surface 11 of the rounder bar 1, which causes them to rotate.

When this occurs, as the conveyor moves (from left to right in the drawing), the dough pieces D move sideways across the conveyor (from up to down normally on FIG. 8). As each dough piece D is thus rotated in contact with the dough-shaping surface 11 of the rounder bar 1, its surface is gradually rounded until it comes to the end of the first stage rounder bar 1 (V), at which point the first stage rounding operation is complete. In this first stage rounder bar 1 (V), the dough receives proper rounding action because vertical grooves formed in the dough-forming surface keep the dough from slipping.

The dough piece D is now handed off from the first stage rounder bar 1 (V) to the second stage rounder bar 1 (W). Because the dough-shaping surface 11 in this rounder bar 1 (W) and the dough-shaping surface 11 of the first stage rounder bar 1 (V) face each other along the direction of the conveyor, the transfer of the dough piece D is smooth. The dough piece D then goes on to be rounded by the shaping surface 11 of the second stage rounder bar 1 (W).

In this stage, as the conveyor 6 moves (from left to right) the dough pieces D move sideways across the conveyor (from down to up normally on FIG. 8). In this second stage rounder bar 1 (W), in the first half of the dough-shaping surface 11 (the anti-skid section), the dough pieces D are rounded without slipping because of the vertical grooves formed therein. In the second half (the groove mark repair section), the marks in the dough caused by the vertical grooves of the preceding rounding process are repaired/removed by horizontal grooves 17 formed in this section of the dough-shaping surface 11. Completion of the above process marks the end of the operation to effect proper rounding of the dough pieces.

When it is desired to change over to process dough for a different lot, the in-use rounder bar 1 (X) is rotated up to a standby position, while at the same time, a switchable alternate rounder bar 1 (Y) that had been in the raised standby position is rotated down to be placed in contact with the conveyer.

Figure 9A:
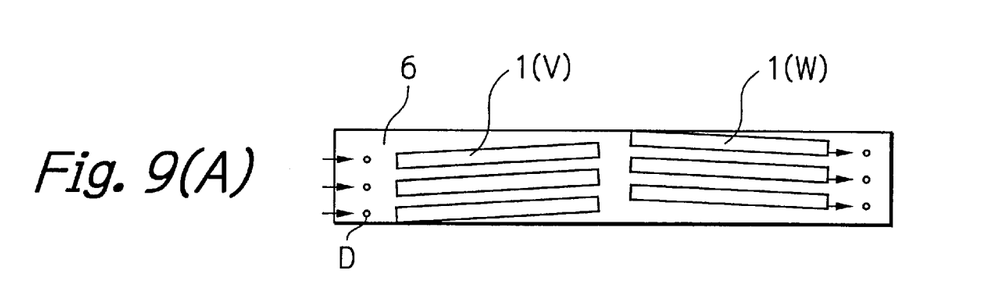
FIGS. 9(A) and 9(B) show examples of different rounder bar placements in the present invention.
Figure 9B:
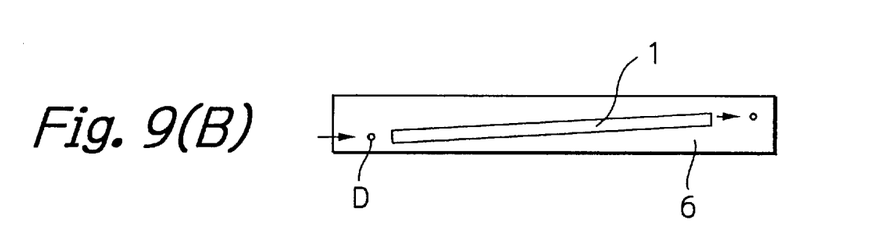

Although the preferred mode for carrying out the invention was described above, the present invention is not limited to the above mode. A variety of modifications thereto are possible while still remaining within the scope of the stated objectives. For example, although the above example described only first and second stage rounder bars 1, a third, fourth, or even more stages of rounder bars could be added, depending on the product. Also, the number of available switchable alternate rounder bars for each stage needs not be limited to two. The number of switchable alternate rounder bars is limited only by the amount space available on the rotating frame for installing them. Also, there are dividing machines that simultaneously output several divided dough pieces from several output opening. Rounding apparatus following such dividing machines can be provided with rounder bars arranged in rows, as shown in FIG. 9(A). In addition, although the example described two serial stages of rounder bars, there could be more stages, or there could be only one stage, as shown in FIG. 9(B).

According to the present invention as described above, alternate rounder bars can easily be switched into position for use, thus greatly reducing setup time. This makes it possible to quickly support a variety of different lots, for a major improvement in productivity.

What is claimed is:

1. A rounding apparatus for rounding divided dough pieces into a given shape, comprising:
   a conveyer for transporting the dough pieces; and
   a plurality of rounder bars configured for rounding the dough pieces, the rounder bars being selectively switchable by rotating one of them into position in contact with the conveyer.

2. A rounding apparatus as recited in claim 1, wherein the rounder bars comprise a first stage rounder bar in front and a second stage rounder bar therebehind.

3. A rounding apparatus as recited in claim 2 wherein dough-shaping surfaces of respective rounder bars are placed on opposite sides thereof.

4. A rounding apparatus as recited in claim 1, wherein a bottom edge piece of each rounder bar is a replaceable unit separate from the main rounder bar unit.

5. A rounding apparatus as recited in claim 1, wherein it comprises two rounder bars placed at angular positions separated from each other by 90 degrees.

6. A rounding apparatus as recited in claim 1, wherein the rounder bars are installed on a rotating frame supported by a main frame of the rounding apparatus.

7. A rounding apparatus as recited in claim 6, wherein an upright bracket is attached to the rotating frame, and a securing bolt is inserted through a slot in the bracket into the mainframe for securing the bracket to the main frame.

8. A rounding apparatus for rounding divided dough pieces into a given shape, comprising:

a conveyer for transporting the dough pieces; and a first stage rounder bar in front and a second stage rounder bar therebehind for rounding the dough pieces, wherein each of the rounder bar stages has a plurality of rounder bars including a switchable alternate rounder bar, each rounder bar is installed on a rotating frame that is rotatably installed on a main frame, a bracket is installed upright on the rotating frame, and provided on the main frame is a securing bolt that is inserted through a slot in the bracket for being tightened to secure the bracket to the main frame, and one of the rounder bars in each stage can be selectively switched by rotating it such as to place it in contact with the conveyer.

9. A rounding apparatus for rounding dough pieces, comprising:

a conveyer having a surface for supporting thereon and transporting the dough pieces; and a plurality of rounder bars any one of which is selectively brought into contact with the surface of the conveyor to engage with the dough pieces conveyed by the conveyor thereby rotating the dough pieces on the surface of the conveyor to round the dough pieces.

10. A rounding apparatus as recited in claim 9; further comprising a rotatable member, wherein said rounder bars are mounted on the rotatable member to enable any one of the rounder bars is brought into contact with the surface of the conveyor by rotating the rotatable member.

11. A rounding apparatus as recited in claim 10, wherein the rounder bars comprise first and second sets of the plurality of the rounder bars, the first and second sets being successively positioned in a direction of conveyance of the dough pieces.

12. A rounding apparatus as recited in claim 11, wherein the rounder bars each have a dough-shaping surface which is adapted to be engaged with the dough pieces conveyed by the conveyor to round the dough pieces and the dough-shaping surfaces of rounder bars of the first and second sets of the rounder bars which are being engaged with the surface of the conveyor faces sidewise and in opposite directions each other.

13. A rounding as recited in claim 10, wherein the rounder bar comprises a main body and a tip edge member which is brought into contact with the surface of the conveyor and replaceable from the main body.

14. A rounding apparatus as recited in claim 13, further comprising a spring for urging the tip edge member against the surface of the conveyor.

15. A rounding apparatus as recited in claim 10, wherein it comprises two rounder bars mounted on the rotatable member at angular positions separated from each other by a predetermined angle.

16. A rounding apparatus as recited in claim 15, further comprising a frame of the apparatus for rotatably supporting the rotatable member, a plate member securely attached to the rotatable member, the plate member being formed with an arc slot extending through about 90 degrees, and a fastening bolt extending through the arch slot and threadably engaged with the frame so as to fasten the plate member at a desired angular position relative to the frame by fastening the fastening bolt.

* * * * *